United States Patent [19]

Poradish

[11] Patent Number: 5,777,694
[45] Date of Patent: Jul. 7, 1998

[54] COLOR WHEEL WITH PLASTIC FILM FILTERS

[75] Inventor: Frank Poradish, Plano, Tex.

[73] Assignee: Texas Instruments Incorporated, Dallas, Tex.

[21] Appl. No.: 489,979

[22] Filed: Jun. 13, 1995

[51] Int. Cl.$^6$ .................................................. H04N 9/12
[52] U.S. Cl. ............................ 348/743; 250/233; 359/234
[58] Field of Search ................................. 348/742, 743, 348/70, 68, 85, 269, 270, 268, 271, 272, 273, 196; 359/589, 891, 234, 235, 889; 362/293; 250/233, 232; H04N 9/12

[56] References Cited

U.S. PATENT DOCUMENTS 4,909,600  3/1990  Ciarlei et al. ............................ 359/235
5,079,544  1/1992  DeMond et al. ........................ 340/701
5,233,385  8/1993  Sampsell .................................. 355/35

FOREIGN PATENT DOCUMENTS

A-0 248 204  12/1987  European Pat. Off. .
A-0 248 974  12/1987  European Pat. Off. .
A-0 615 146   9/1994  European Pat. Off. .
A-0 621 495  10/1994  European Pat. Off. .

*Primary Examiner*—Michael H. Lee
*Attorney, Agent, or Firm*—Julie L. Reed; James C. Kesterson; Richard L. Donaldson

[57] ABSTRACT

A color wheel (15) for use in a display system (10). The color wheel (15) is comprised of a rigid hub (23) and an outer perimeter of color filter segments (21), which are made from a thin plastic material.

20 Claims, 2 Drawing Sheets

COLOR WHEEL WITH PLASTIC FILM FILTERS

TECHNICAL FIELD OF THE INVENTION

This invention relates to image display systems, and more particularly to digital image display systems that use a color wheel.

BACKGROUND OF THE INVENTION

Image display systems based on spatial light modulators (SLMS) are an alternative to image display systems based on cathode ray tubes (CRTs). SLM systems provide high resolution without the bulk of CRT systems.

Digital micro-mirror devices (DMDs) are one type of SLM, and may be used for either direct view or for projection displays. A DMD has an array of hundreds or thousands of tiny tilting mirrors, each of which provides light for one pixel of an image. To permit the mirrors to tilt, each mirror is attached to one or more hinges mounted on support posts, and spaced by means of a fluidic (air or liquid) gap over underlying control circuitry. The control circuitry provides electrostatic forces, which cause each mirror to selectively tilt. For display applications, image data is loaded to memory cells of the DMD and in accordance with this data, mirrors are tilted so as to either reflect light to, or deflect light from, the entrance pupil of a projection lens and then to an image plane.

One approach to providing color images in an SLM display system is referred to as "sequential color". All pixels of a frame of the image are sequentially addressed with different colors. For example, each pixel might have a red, a green, and a blue value. Then, during each frame period, the pixels of that frame are addressed with their red, green, then blue data, alternatingly. A color wheel having three segments of these same colors is synchronized to the data so that as the data for each color is displayed by the SLM, the light incident on the SLM is filtered by the color wheel. For standard display rates, such as the 30 frame per second NTSC rate, the eye perceives the image as having the proper color.

Existing color wheels are comprised of glass dichroic filters arranged around a hub. These color wheels are difficult to manufacture and require an expensive coating process.

SUMMARY OF THE INVENTION

One aspect of the invention is a color wheel for a display system. The color wheel is essentially a rigid hub with a thin plastic rim of filter material. In one embodiment, the hub has a front piece and a back piece for attachment together to form a generally circular hub. This hub is made from a rigid material, such as plastic. A number of color filter segments are also made from a plastic material, but may be thin and flexible. These filter segments are substantially pie-shaped, such that a circular edge of each filter segment extends from the perimeter of the hub, with the opposing edge of the filter segment being secured between the front piece and the back piece of said hub.

An advantage of the invention is that it is a low cost color wheel, compared to previously used dichroic glass color wheels. It is amenable to mass production and may be made entirely from plastic materials. The color wheel is lightweight, and less prone to vibration. Its low inertia permits faster spin-up times during operation. In embodiments having a two-piece hub, built-in clamping features can be provided for attachment of the color wheel to the shaft of the color wheel motor.

DETAILED DESCRIPTION OF THE INVENTION

Display System Overview

The following description is in terms of a display system that displays images generated by an SLM or other pixel array display device. The term "pixel array display device" is used in a broad sense to include any type of array that generates a display using individually addressed pixels. Thus, for example, the display device might be a liquid crystal array. However, the invention is not limited to such devices, and could be used with any display system that uses a color wheel for sequential color displays. For example, the data described herein could be converted to an analog signal for use by a white light CRT whose images are filtered by a color wheel.

Figure 1:
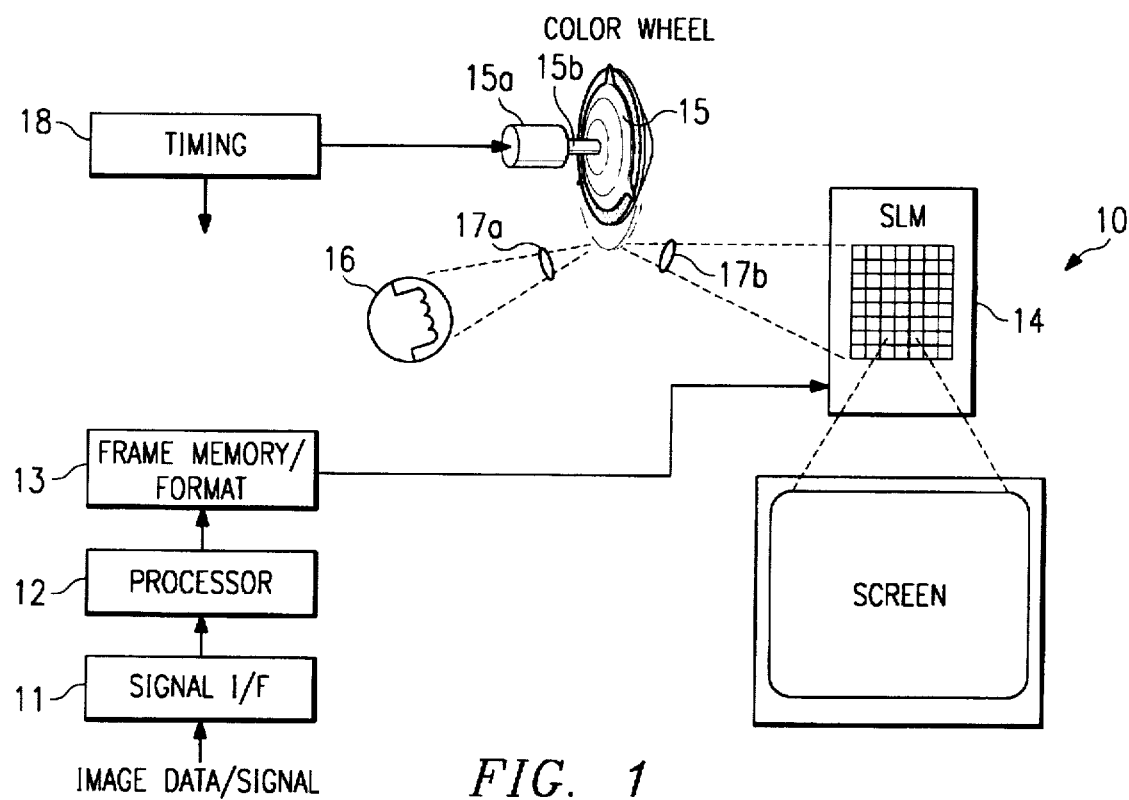
FIG. 1 is a block diagram of a display system having a color wheel configured and operated in accordance with the invention.

FIG. 1 is a block diagram of a typical SLM-based image display system 10 that uses a color wheel 15 in accordance with the invention.

In the example of FIG. 1, color wheel 15 has three filter segments, one red, one green, one blue. However, other colors could be used, and fewer or more than three colors could be used. As explained below, the invention is directed to a color wheel whose filter segments are made from thin plastic film at the outer circumference of a hub.

The following overview of the various components of display system 10 provides details helpful to understanding of the invention. Further details pertaining to a DMD-based image display system with other types of color wheels are set out in U.S. Pat. No. 5,079,544, entitled "Standard Independent Digitized Video System"; In U.S. patent Ser. No. 08/147,249, entitled "Digital Television System"; and in U.S. patent Ser. No. 08/146,385, entitled "DMD Display System". Further details describing the general operation of color wheels for SLM-based display systems are set out in U.S. Pat. No. 5,233,385, entitled "White Light Enhanced Color Field Sequential Projection"; U.S. patent Ser. No. 08/179,028, entitled "Method and Apparatus for Sequential Color Imaging"; and U.S. patent Ser. No. 08/339,379, entitled "Digital Motor Controller for Color Wheel". Each of these patents and patent applications is assigned to Texas Instruments Incorporated, and each is incorporated herein by reference.

Signal interface 11 receives some kind of input signal. For purposes of example herein, it will be assumed that the input signal is a standard analog video signal having horizontal and vertical synchronization components. However, in other systems, the input signal might be graphics data already in digital form.

In the case of a video input signal, interface 11 separates the video signal from synchronization and audio signals. It includes an A/D converter and a Y/C separator, which convert the data into pixel data samples and separate the luminance data from the chrominance data. The signal could be converted to digital data before Y/C conversion or Y/C separation could occur before digitization.

Pixel data processor 12 prepares the data for display, by performing various processing tasks. Processor 12 includes processing memory for storing pixel data during processing. The tasks performed by processor 13 may include linearization, colorspace conversion, and line generation. Linearization removes the effect of gamma correction, which is performed on broadcast signals to compensate for the non-linear operation of CRT displays. Colorspace conversion converts the data to RGB data. Line generation can be used to convert interlaced fields of data into complete frames by generating new data to fill in odd or even lines. The order in which these tasks are performed may vary.

Display memory 13 receives processed pixel data from processor 12. Display memory 13 formats the data, on input or on output, into "bit-plane" format and delivers the bit-planes to SLM 14. The bit-plane format provides one bit at a time for each pixel of SLM 14 and permits each pixel to be turned on or off in accordance with the weight of that bit. For example, where each pixel is represented by 8 bits for each of three colors, there will be 3×8=24 bit-planes per frame. Bit-planes containing less significant bits will result in shorter display times than the bit-planes containing more significant bits.

In a typical display system 10, memory 13 is a double-buffer memory, which means that it has a capacity for at least two display frames. The buffer for one display frame can be read out to SLM 14 while the buffer or another display frame is being written. The two buffers are controlled in a "ping-pong" manner so that data is continuously available to SLM 14.

SLM 14 may be any type of SLM. For purposes of example, this description is in terms of a display system whose SLM is a digital micro-mirror device (DMD). However, as stated above, the same concepts apply to display systems that use other types of SLMs or other image generating devices.

Light incident on SLM 14 is provided by a light source 16 and is transmitted through a rotating color wheel 15. In the system of FIG. 1, SLM 14 is a reflective SLM (a DMD), and the color wheel 15 is used to filter the light before reflection. As an alternative, the color wheel 15 could be placed so that light is filtered after being emitted or reflected.

As explained in the Background, the data for each color are sequenced and the display of the data is synchronized so that the portion of color wheel 15 through which light is being transmitted to SLM 14 corresponds to the data being displayed. In the example of this description, each pixel is represented by RGB data, which means that each pixel has a red value, a green value, and a blue value. As the values for each color of all pixels in a frame are being displayed, color wheel 15 rotates so that the light is transmitted through the corresponding red, blue or green filter. For each pixel, the combination of these three values is perceived as the desired color.

Color wheel 15 is driven by a motor 15a via shaft 15b. Motor 15a includes a controller that controls the speed and phase of color wheel 15. For example, the desired speed might be 60 revolutions per second to correspond to a 60 frame per second display rate. The phase is set so that the proper filter (red, green, or blue) of color wheel 15 is transmitting light from SLM 14 as the data for that filter is being displayed. To maintain a correct phase relationship between the color wheel 15 and the data being displayed, the color wheel 15 can speed up or slow down or the data can be delayed or skipped.

For a DMD-based system, the data delivered to SLM 14 is in a special bit-plane format for pulse width modulation. Each red, green, and blue value of a pixel has n bits per frame. A pixel value of 0 (black) results in the pixel being off for that color during the frame. For each color, each mirror element of the SLM 14 can be "on" for a duration of anywhere from 1 LSB period to $2^n-1$ LSB periods. In other words, each color has $2^n-1$ time slices, during which any pixel can be on for any number of time slices between 0 and $2^n-1$.

Where a frame of data is displayed for a frame period of T seconds, color wheel 15 has a period of revolution of T seconds. If each color were to be displayed for an equal time, the color wheel 15 would have equally sized segments of each color and the data for each color would then be displayed for T/3 seconds. The LSB period would be the frame time for each color divided by the number of LSB periods for that color.

Master timing unit 18 provides various system control functions. One timing signal provided by master timing unit 18 is a signal defining the display times for each bit weight of the pixel value.

Although not illustrated in FIG. 1, system 10 also includes a projection lens and various other optical devices for collecting and projecting the image from SLM 14 to the image plane (screen).

Figure 2:
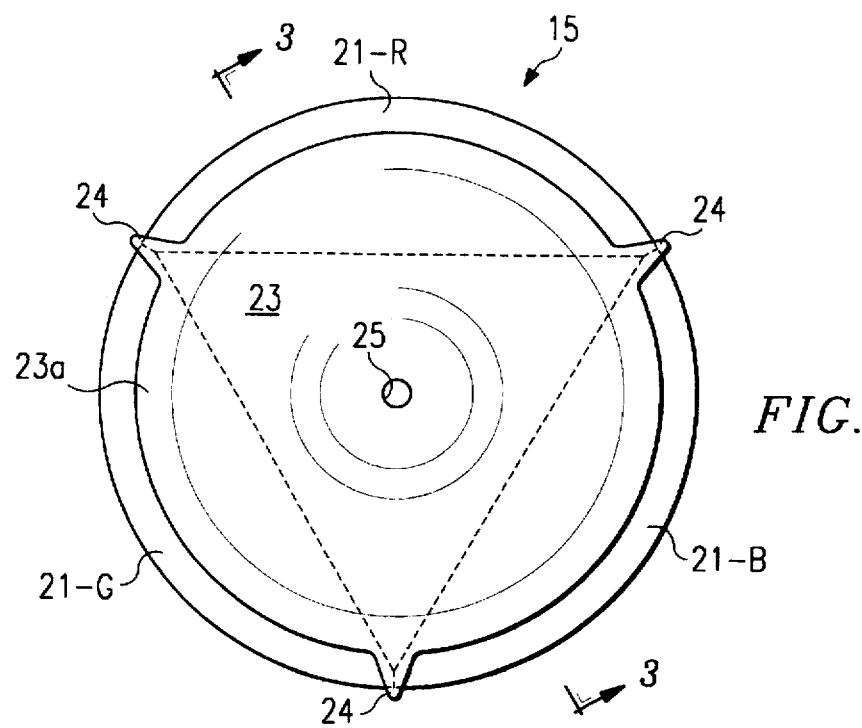
FIG. 2 is a front view of a color wheel in accordance with the invention.
Figure 3:
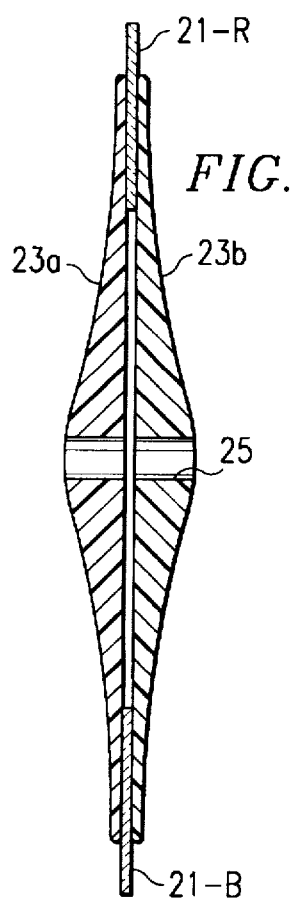
FIG. 3 is a side view of a color wheel in accordance with the invention.

FIGS. 2 and 3 are a front view and a side view, respectively, of color wheel 15. A typical size of color wheel 15 is approximately 4 inches in diameter for incident light having a spot size of 4–6 millimeters. This size is sufficiently large so as to minimize the time when the incident light coincides with a spoke 24 or other transition between filter segments 21.

Color wheel 15 is comprised of a rigid two-piece hub 23, which has a front piece 23a and a back piece 23b.

Front piece 23a and back piece 23b are attached in a manner that clamps filter segments 21 into place. An example of a suitable material for hub 23 is plastic, which may be easily molded to form pieces 23a and 23b.

In the example of this description, color wheel 15 has three filter segments 21, one for each of three primary colors: red, blue and green. However, in other embodiments, there could be more than one segment for each color. There might also be segments for more or for fewer colors, and there might be a clear segment. Each filter segment 21 is made from a thin plastic material. Examples of suitable materials are mylar or polyester film. The plastic is impregnated with dye, or otherwise made to create an absorptive filter to obtain the desired color. A feature of the invention is that filter segments 21 need not be rigid and can be made from relatively flexible materials.

Each filter segment 21 is substantially pie-shaped, so that its inner area can be clamped within hub 23 and its circular outer perimeter can extend out from hub 23. The two pieces 23a and 23b of hub 23 snap or otherwise attach together, thereby "sandwiching" the appropriate portion of filter segments 21.

As illustrated in FIG. 2, the front piece 23a and back piece of 23b have a spoke 24 at each junction of one filter segment 21 to another. This contemplates that filter segments 21 will be comprised of separate pieces. The spokes 24 join the abutting edges of adjacent filter segments 21 and prevent wind resistance at these edges during operation as well as add stiffness to the filter portion of the color wheel 15.

Figure 4:
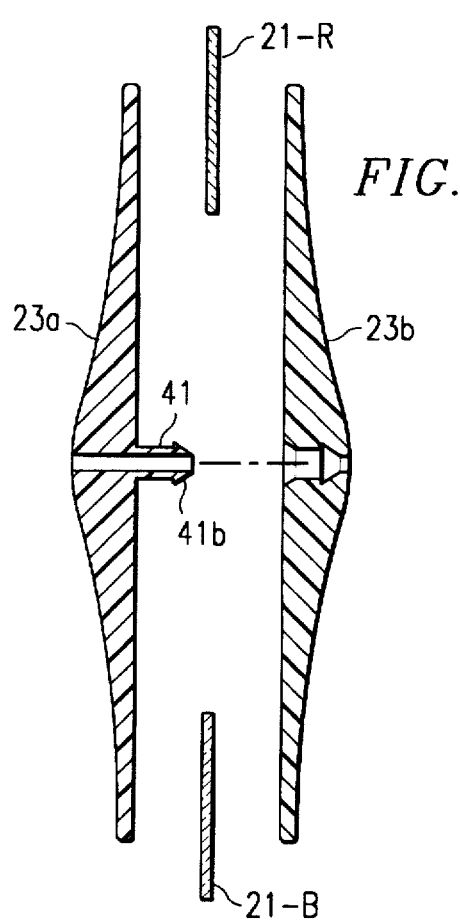
FIG. 4 is an exploded side view of the color wheel, illustrating self-attaching means for securing the two pieces of the hub together.

Various mechanical features can be easily molded to the inner surfaces of pieces 23a and 23b so that these pieces can be self-securing when pressed together. For example, as illustrated in FIG. 4, one piece 23a might have a plastic sleeve 41 protruding from its inner surface. The other piece 23b has a corresponding center opening for receiving the sleeve, with the diameter of the opening being of a size that will provide a snug fit of sleeve 41. Sleeve 41 has a wedge 41a that snaps into a wedge-shaped enlargement of the opening in piece 23b. This permits pieces 23a and 23b to be clamped to shaft 15b without additional parts. Other built-in mechanical features can easily be imagined, with interlocking wedges or other features for attaching the hub 23 to the color wheel motor shaft 15b. Extrinsic fastening means, such as screws, can also be used.

The thickness of filter segments 21 is a balance between being sufficiently thick to provide some stiffness and sufficiently thin so as to minimize loss of light. To some extent, centrifugal force during operation can compensate for lack of stiffness. Typical thicknesses of filter segments 21 are between 1 and 2 millimeters.

As illustrated in FIG. 3, hub 23 may be made thicker at its mid-portion where it is attached to the drive shaft of the color wheel motor. This results in hub 23 being "mass loaded" around the drive shaft of the color wheel motor and enhances proper balance.

In an alternative embodiment, color wheel 15 could have a hub 23 that is comprised of only one piece 23a. The filter segments 21 would be attached to one side of hub 23, around its perimeter, by means such as glue. As discussed above, hub 23 may have spokes 24, to which the filter segments 21 would be attached, either to join edges of separate filter segments 21 or to add stiffness to the filter portion of the color wheel.

Figure 5:
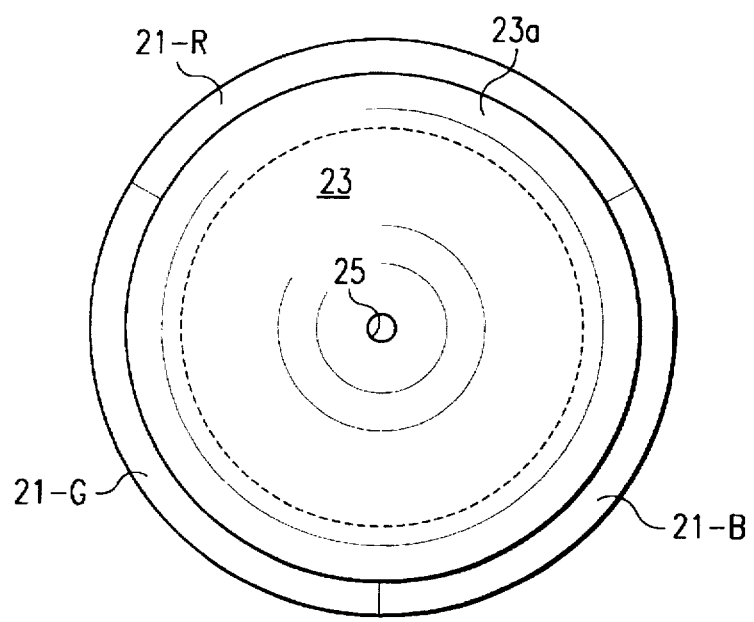
FIG. 5 is a front view of an alternative embodiment of the color wheel, which has a single-piece filter.

FIG. 5 illustrates another embodiment of color wheel 15, where all filter segments 21 are made from a single piece of material having differently colored areas, each forming a different filter segment 21. The filter segments 21 are ring-shaped, and may be attached between two pieces 23a and 23b of hub 23 or attached to one side of a single-piece hub 23. In this case, spokes 24 might not be necessary depending on the stiffness of the filter material.

In operation, color wheel 15 is rotated sufficiently fast so as to introduce a radial airflow that cools the filter segments 21 from the absorbed radiation. A rotation speed of approximately 3600 revolutions per minute has been found to be satisfactory.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A color wheel for a display system, comprising:
   a hub having a generally circulate shape and being made from a rigid material; and
   two or more color filter segments made from a plastic material, said filter segments being substantially pie-shaped and attached to said hub such that circular edges of said filter segments extend from said hub and opposing edges of said filter segments are secured to said hub and such that each of said filter segments abuts other of said filter segments.

2. The color wheel of claim 1, wherein said hub has a front piece and a back piece for attachment together, and wherein said filter segments are secured between said front piece and said back piece.

3. The color wheel of claim 2, wherein said front piece and said back piece have self-attaching means for attaching said front piece to said back piece.

4. The color wheel of claim 2, wherein one of said front piece or said back piece has a sleeve extending from its inner center surface for attachment around a shaft of said color wheel and the other of said front piece or said back piece has a corresponding opening in its inner center surface for receiving said sleeve.

5. The color wheel of claim 1, wherein said filter segments are attached to one side of said hub.

6. The color wheel of claim 1, wherein said filter segments are absorptive color filter segments.

7. The color wheel of claim 1, wherein said hub is made from a plastic material.

8. The color wheel of claim 1, wherein said filter segments are made from a plastic material.

9. The color wheel of claim 1, wherein said filter segments are in the order of 1 millimeter thick.

10. The color wheel of claim 1, wherein said hub is thicker at its center than at its perimeter.

11. A color wheel for a display system, comprising:
    a hub having a generally circular shape and being made from a rigid material; and
    a one-piece color filter made from a plastic material, said filter being substantially ring-shaped and attached around a perimeter of said hub such that an outer circular edge of said filter extends from said hub and an inner circular edge of said filter is attached to said hub, said filter having differently color areas.

12. The color wheel of claim 11, wherein said hub has a front piece and a back piece for attachment together, and wherein said filter is secured between said front piece and said back piece.

13. The color wheel of claim 12, wherein said front piece and said back piece have self-attaching means for attaching said front piece to said back piece.

14. The color wheel of claim 12, wherein one of said front piece of said back piece has a sleeve extending from its inner center surface for attachment around a shaft of said color wheel and the other of said front piece or said back piece has a corresponding opening in its inner center surface for receiving said sleeve.

15. The color wheel of claim 11, wherein said filter is attached to one side of said hub.

16. The color wheel of claim 11, wherein said filter is an absorptive color filter.

17. The color wheel of claim 11, wherein said hub is made from a plastic material.

18. The color wheel of claim 11, wherein said filter is made from a plastic material.

19. The color wheel of claim 11, wherein said filter is in the order of 1 millimeter thick.

20. The color wheel of claim 11, wherein said hub is thicker at its center than at its perimeter.

\* \* \* \* \*